United States Patent

Stumfall et al.

[19]

[11] Patent Number: 5,942,811
[45] Date of Patent: Aug. 24, 1999

[54] APPARATUS AND METHOD FOR EXTENDING THE SUPPLY OF RESERVED POWER DURING A LINE POWER INTERRUPTION

[75] Inventors: David M. Stumfall, Santa Ana; Kazutoyo Sekine, Irvine, both of Calif.

[73] Assignees: Sony Corporation, Tokyo, Japan; Sony Trans Com Inc., Irvine, Calif.

[21] Appl. No.: 08/901,325

[22] Filed: Jul. 28, 1997

[51] Int. Cl.⁶ .................................................. H02J 7/00
[52] U.S. Cl. .............................. 307/64; 397/66; 397/64; 397/125; 397/130; 361/92; 323/276
[58] Field of Search ..................... 307/64, 43, 18, 307/19, 11, 23, 29, 38, 39, 48, 65, 66, 70, 80; 340/333; 361/92

[56] References Cited

U.S. PATENT DOCUMENTS

| | | | |
|---|---|---|---|
| 4,481,590 | 11/1984 | Otten | 364/479 |
| 4,591,914 | 5/1986 | Hakamada et al. | 307/64 |
| 4,618,857 | 10/1986 | Dubois et al. | 340/654 |
| 4,703,191 | 10/1987 | Ferguson | 307/64 |
| 4,827,149 | 5/1989 | Yabe | 307/64 |
| 5,036,261 | 7/1991 | Testin | 315/411 |
| 5,375,247 | 12/1994 | Hueser | 395/750 |
| 5,420,783 | 5/1995 | Gross | 307/64 |
| 5,422,681 | 6/1995 | Hayashi | 348/730 |
| 5,436,513 | 7/1995 | Kaye et al. | 307/66 |
| 5,655,070 | 8/1997 | Suwa et al. | 395/182.2 |
| 5,679,985 | 10/1997 | Brailey et al. | 307/18 |
| 5,739,594 | 4/1998 | Sheppard et al. | 307/64 |
| 5,774,105 | 6/1998 | Yamamoto et al. | 345/97 |
| 5,777,399 | 7/1998 | Shibuya | 307/66 |
| 5,781,422 | 7/1998 | Lavin et al. | 307/64 |
| 5,841,269 | 11/1998 | Schoonmaker et al. | 323/276 |
| 5,859,480 | 1/1999 | Ryu et al. | 307/64 |

*Primary Examiner*—Jeffrey Gaffin
*Assistant Examiner*—Peter Zura
*Attorney, Agent, or Firm*—Blakely, Sokoloff, Taylor & Zafman LLP

[57] ABSTRACT

An apparatus and method for extending the supply of reserved power during an interruption to power supplied by a primary power supply in an in-flight entertainment system is disclosed. The apparatus has a power supply that provides a first supply voltage and a capacitor coupled to the power supply that stores a second supply voltage. The apparatus further has a detector circuit that generates a first signal upon detection of an interruption in the first supply voltage. A control circuit coupled to the detector circuit, the capacitor and the power supply, generates a second signal in response to the first signal. A processing circuit coupled to the power supply, the capacitor and the control circuit, disables its operation in response to the second signal. The capacitor provides the second supply voltage to the control circuit in response to the interruption.

20 Claims, 4 Drawing Sheets

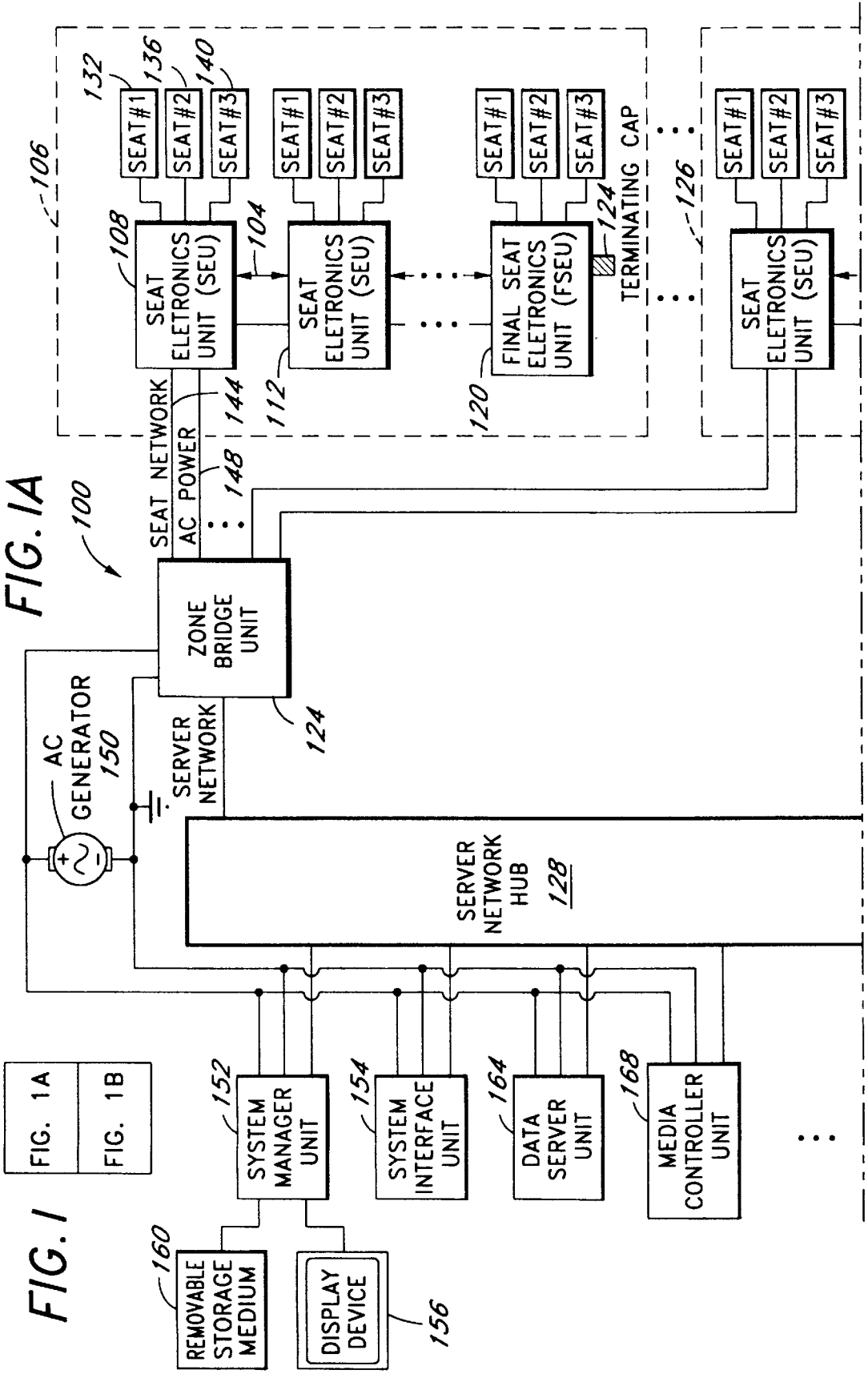

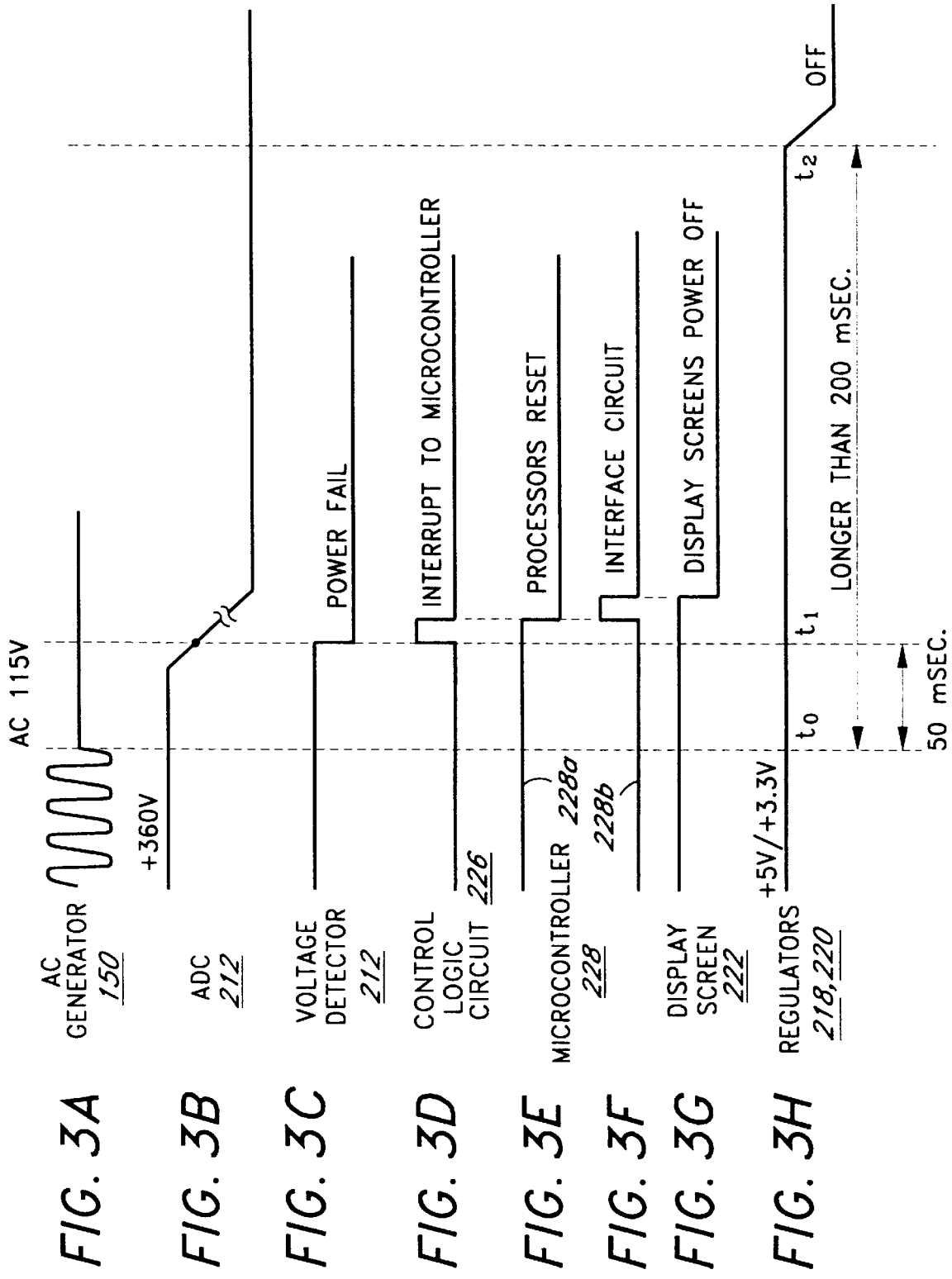

APPARATUS AND METHOD FOR EXTENDING THE SUPPLY OF RESERVED POWER DURING A LINE POWER INTERRUPTION

BACKGROUND OF THE INVENTION

1. Field of the Invention

The present invention relates to power supplies. More particularly, the present invention relates to a method and apparatus of extending the supply of reserved power during a line power interruption.

2. Description of the Related Art

Over the past few decades, commercial aircraft has become a necessary mode of travel for personal and business reasons. To improve passenger comfort, commercial aircraft typically offer a number of entertainment activities that can be enjoyed by the passenger, such as video games, movies and various selections of music. In addition, various electronic systems for supporting communications and/or other in-flight functions are provided.

Such electronic systems typically comprise seat electronic units which receive in-flight entertainment programs from a central system and which subsequently deliver these programs to one or more passengers on the aircraft. These electronic units typically include circuitry which draw power from two different power sources, such as a +5 V power supply and a +3.3 V power supply. The +5V and +3.3V power supplies in turn obtain power from a 115V AC source via an AC-to-DC converter.

During a line power interruption or power suspension to the +5V and the +3.3V power supplies, reserved power is typically made available to the circuitry in the electronic units for a minimum period of time (typically 200 ms). This is typically accomplished by storing sufficient energy in holding capacitors that are coupled to the DC regulator, which is in turn coupled to the +5V and the +3.3V power supplies, to provide the supply current and voltage requirements of the circuitry in the electronic units.

In such a conventional system, the amount of time that power is provided to the circuitry, is dependent on the energy stored in the holding capacitors. The amount of energy stored may be increased, and the holding period may be extended, by increasing the storage capacity of the holding capacitors. This is accomplished by using larger holding capacitors, which results in a corresponding increase in circuit board space, weight and cost. By extending the holding period, the amount of current and voltage provided by reserved power may be extended, thereby ensuring that the circuitry in the electronic units is more reliable.

Accordingly, there is a need in the technology for an apparatus and method for extending the supply of reserved power to circuits during a line power interruption, without the need for increasing the size of holding capacitors coupled to the power source.

BRIEF SUMMARY OF THE INVENTION

An apparatus and method for extending the supply of reserved power during an interruption to power supplied by a primary power supply in an in-flight entertainment system is disclosed. The apparatus comprises a power supply that provides a first supply voltage and a capacitor coupled to the power supply that stores a second supply voltage. The apparatus further comprises a detector circuit that generates a first signal upon detection of an interruption in the first supply voltage. A control circuit coupled to the detector circuit, the capacitor and the power supply, generates a second signal in response to the first signal. A processing circuit coupled to the power supply, the capacitor and the control circuit, disables its operation in response to the second signal. The capacitor provides the second supply voltage to the control circuit in response to the interruption.

BRIEF DESCRIPTION OF THE DRAWINGS

FIGS. 1A and 1B together show an overall schematic view of a flight entertainment system 100 which implements the power control system of the present invention.

FIGS. 3A–H are timing diagrams illustrating the operation of power control system 200 of FIG. 2.

DETAILED DESCRIPTION OF THE INVENTION

Figure 1B:
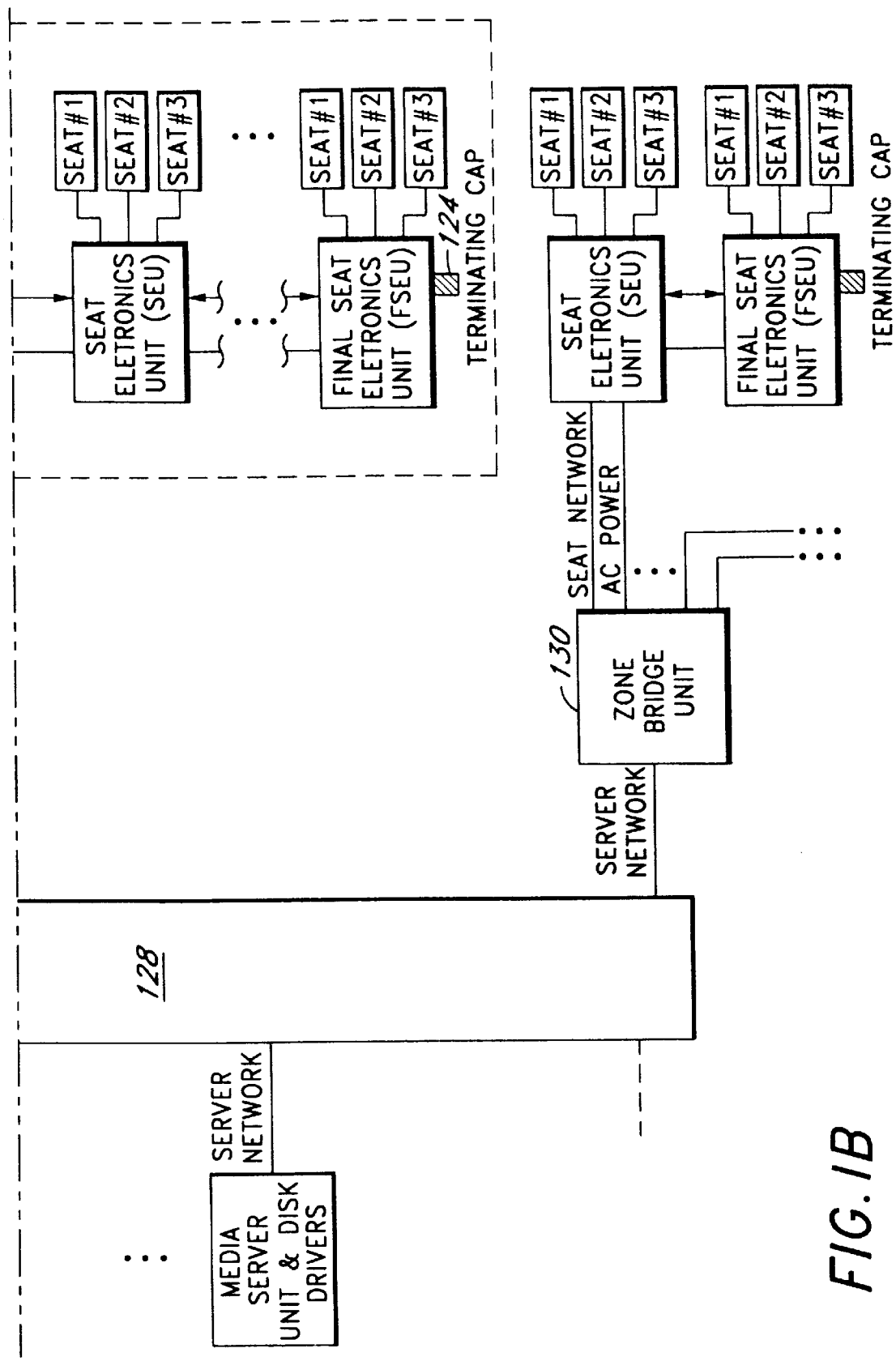

FIGS. 1A and 1B together show an overall schematic view of an in-flight entertainment (IFE) system 100 which implements the power control system of the present invention. The IFE system 100 includes an interconnect bus 104, a daisy chain 106 of interconnecting seat electronic units (SEUs) 108, 112, 120 and a terminating cap 124. Each daisy chain 106 is connected such that the output of one SEU is connected to the input of the next SEU until the final seat electronics unit (FSEU) 120 is reached. The SEUs receive the audio and video data from a Zone Bridge Unit (ZBU) 124. Each ZBU 124 supports multiple daisy chains 106, 126. A Server Network Hub 128 coordinates and communicates the information to and from multiple ZBUs 124, 130 to supporting electronics.

Each SEU, e.g. SEU 108, provides the necessary audio and video signals to support a number of passenger seats 132, 136, 140 in the passenger compartment of an aircraft. In one embodiment, an SEU may support two to three passenger seats depending on the aircraft configuration used. In the described embodiment, up to 12 SEUs are daisy chained together although the number of SEUs in a daisy chain may vary.

Each ZBU 124 services one section or zone of an aircraft. A ZBU 124 may service multiple daisy chains 106, 126. In one design, daisy chain 106, 126 may serve an aisle of a plane while each ZBU 124 serves a plane section. The bus which forms each daisy chain 106, is terminated at the FSEU 120. The FSEU includes terminating cap 124 which terminates interconnect bus 104.

ZBU 124 distributes audio and video data on a seat network bus 144 and power along AC power line 148 to the various SEUs 108, 112. In one embodiment, power is provided by an AC generator 150 located on the aircraft. The system may also receive data, such as credit card information, entertainment requests, or merchandise orders, from seat electronics (not shown) in the vicinity of passenger seat 132, 136, 140. The respective SEU unit 108 receives the data and may then transfer the data to the respective ZBU 124 via seat network bus 144. This information may be further transmitted through the server network hub 128 to other electronics aboard the aircraft, or in the case of telephone or other communication to a public switched telephone network ("PSTN") or other external networks outside of the aircraft through a system interface unit 154. A system manager unit (SMU) 152 oversees operation of the IFE. The SMU 152 is coupled to a display device 156 which displays passenger requests and system status information. A floppy drive 160 is also provided for storing data.

The IFE, including the SMU 152 and the SEUs 108, 112, 120 is designed to perform self diagnostic checks. In particular, the SEUs perform diagnostic checks and may forward error messages to the SMU. The SMU 152 then displays the error on display device 156 or the information is stored on a floppy disk or other removable storage medium 160 for further use or analysis. This information enables technicians or maintenance personnel to quickly troubleshoot the IFE system. The server network hub 128 may further be coupled to other units which provide information such as Data Server Units (DSUs) 164 and Media Controller Units (MCUs) 168 which provide the video/audio contact.

In a preferred embodiment, the power control system 200 (FIG. 2) of the present invention may be used in supplying current to electronic systems which provide in-flight entertainment services such as those shown in FIGS. 1A and 1B. These electronic systems include, but are not limited to, SEUs 108, 112, 120, System Manager Unit 152, System Interface Unit 154, Data Server Unit 164, and Media Controller Unit 168. It is apparent to one of ordinary skill in the art that the power control system 200 of the present invention, may be implemented in any electronic system, and is not limited to electronic systems which provide in-flight entertainment services.

Figure 2:
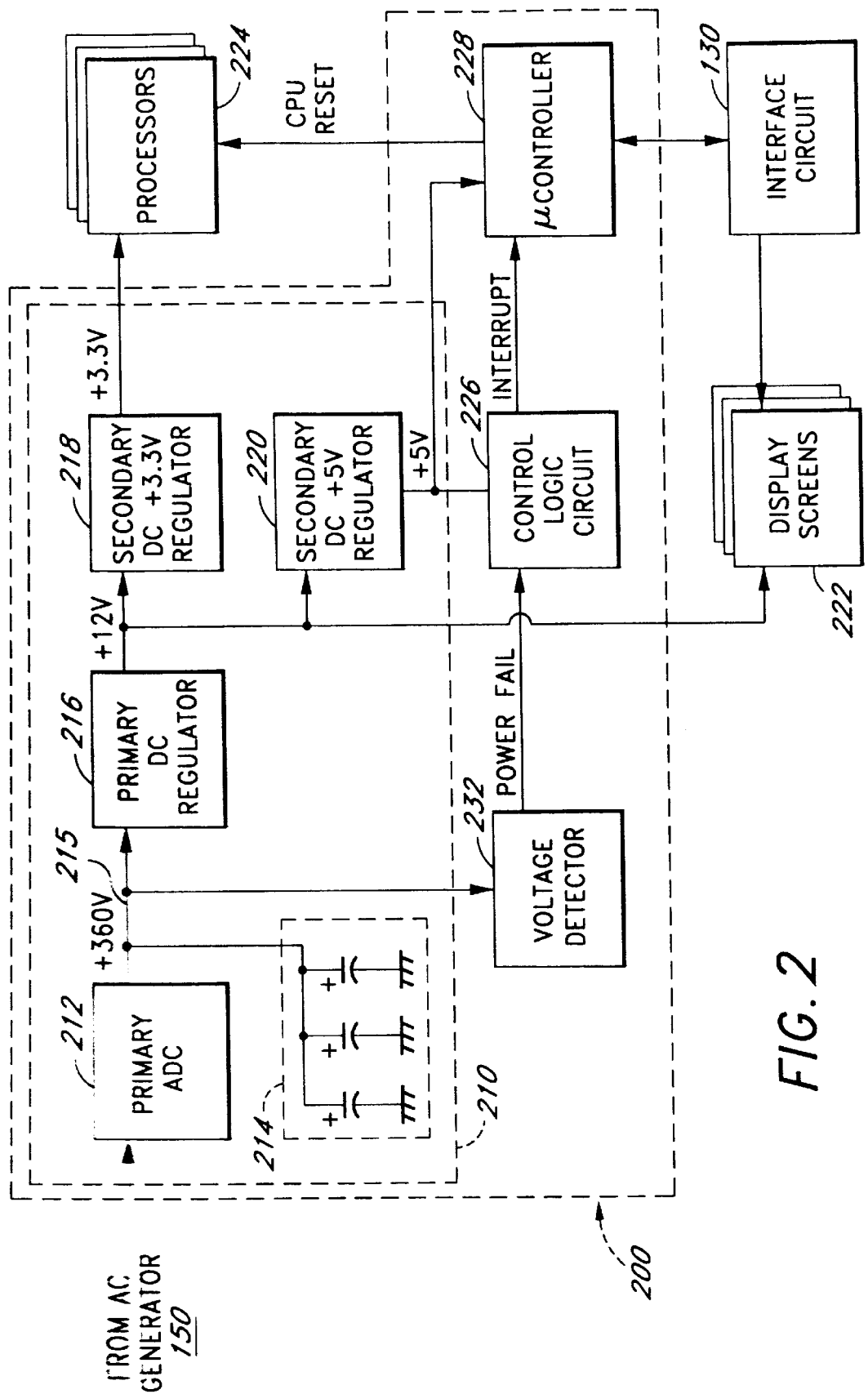
FIG. 2 is a detailed block diagram of the power control system 200 of the present invention.

FIG. 2 is a detailed block diagram of a power control system 200 of the present invention that is implemented within an electronic system. The electronic system receives its current and voltage supply via a power supply 210, which in turn obtains supply current and voltage from the AC generator 150. The received current is converted to DC (typically +360V) by a primary AC-to-DC converter (ADC) 212 located within the power supply 210. The converted DC current is provided to a primary DC regulator 216 via line 215. The primary DC regulator 216 provides a +12V DC supply to a first secondary DC regulator 218, a second secondary DC regulator 220 and a plurality of display screens 222. In one embodiment, the first secondary DC regulator 218 provides an output voltage of +3.3V, while the second secondary DC regulator 220 provides an output voltage of +5 V. The primary DC regulator 216, the first secondary DC regulator 218 and the second secondary DC regulator 220 are all located within the power supply 210. The power supply 210 further comprises a holding capacitor 214 that is coupled to the ADC 212 at one end, and to ground at the other, which stores sufficient energy for driving circuitry within the electronic system in the event of a line power interruption, as discussed in detail in the following sections. The holding capacitor 214 may comprise a plurality of capacitors, an example of which includes a bank of three aluminum electrolytic capacitors. An example of one of these aluminum electrolytic capacitors is that marketed by Panasonic Industrial Corp. under the part designation ECOS2GB221DA. In one embodiment, each of the capacitors in the bank of capacitors is a 220 $\mu$F capacitor.

The first secondary power supply 218 provides supply current and voltage to a plurality of processors 224 located in the electronic system. The second secondary power supply 220 provides supply current and voltage to a control logic circuit 226 and a microcontroller 228. When enabled, the microcontroller 228 provides control signals to the display screens 222 via a control interface 230, to control operation of the display screens 222.

The present invention provides detection of voltage drop on line 215 by a voltage detector 232 located within the electronic system. If a voltage drop representative of a line power interruption is detected, the voltage detector 232 issues a signal to the control logic circuit 226, which in turn sends an interrupt to the microcontroller 228. In one embodiment, a line power interruption is considered to have occurred when less than 90% of the normal supply voltage is available. Upon receipt of the interrupt, the microcontroller 228 sends a control signal to the plurality of processors 224 to reset or to power down the processors 224. The microcontroller 228 also sends a control signal to the display screens 222 via control interface 230 to power down the display screens 222. As a result, the energy stored in the holding capacitor 214 will only be drawn by the microcontroller 228 and the control logic circuit 226 in the event of a power line interruption, instead of being also drawn by the processors 224 and the display screens 222.

FIGS. 3A–3H are timing diagrams which illustrate the operation of the power control system 200 of FIG. 2. Prior to time $t_0$, the AC generator 150 supplies current voltage to the electronic system (FIG. 3A) via ADC 212. In one embodiment, the voltage supplied by the AC generator 150 is 115V. At $t_0$, there is a drop in the voltage supplied by the AC generator 150 via ADC 212. In response, the voltage provided by ADC 212 also drops (FIG. 3B). When the voltage provided by the ADC 212 is less than 90% of its normal voltage, (for example, at time $t_1$) the voltage detector 232 issues a control signal to the control logic circuit 226 (FIG. 3C). The control logic circuit 226 issues an interrupt to the microcontroller 228 (FIG. 3D). In response, the microcontroller 228 issues a signal 228a to reset the processors 224 (FIG. 3E) and another signal 228b to the display control interface circuit 230 (FIG. 3F) which in turn, turns off the display screens 222 (FIG. 3G). As a result, the use of the reserved power stored in the holding capacitor 214 (FIG. 2) may be extended to $t_2$, which is typically beyond 200 ms, and preferably in the range of 210 ms–1100 ms. At $t_2$, both the first and second regulators 218 and 220 malfunction. However, this situation may be delayed or avoided through the implementation of the present invention.

Through the implementation of the principles of the present invention, the supply of reserved power to circuits may be extended during a line power interruption, without the need for increasing the size of the holding capacitors. Alternatively, the reserved power may be provided using smaller holding capacitors, thereby decreasing circuit board space, weight and cost.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A power control apparatus for extending the supply of reserved power during an interruption to power supplied by a primary power supply in an in-flight entertainment system, comprising:

a power supply that provides a first supply voltage;

a capacitive element coupled to the power supply that stores a second supply voltage;

a detector circuit that generates a first signal upon detection of an interruption in the first supply voltage;

a control circuit coupled to the detector circuit, the capacitive element and the power supply, said control circuit generates a second signal in response to said first signal; and a processing circuit coupled to the power supply, the capacitive element and the control circuit, the operation of the processing circuit being disabled in response to said second signal, wherein said capacitive element provides the second supply voltage to said control circuit in response to the interruption.

2. The apparatus of claim 1, wherein said detector circuit is a voltage detector.

3. The apparatus of claim 1, wherein the control circuit comprises a microcontroller.

4. The apparatus of claim 3, wherein the control circuit further comprises a control logic circuit coupled to said microcontroller.

5. The apparatus of claim 1, wherein the processing circuit comprises a central processing unit.

6. The apparatus of claim 1, wherein the processing circuit comprises a display control interface circuit and a display screen.

7. The apparatus of claim 1, wherein said capacitive element comprises a plurality of capacitors.

8. The apparatus of claim 1, wherein said first supply voltage is a primary supply voltage and said second supply voltage is a secondary supply voltage.

9. The apparatus of claim 1, wherein said capacitive element provides said second supply voltage for more than 200 ms.

10. The apparatus of claim 1, wherein said capacitive element provides said second supply voltage for 1100 ms.

11. A method of providing for extending the supply of reserved power during an interruption of power from a primary power supply in an in-flight entertainment system, comprising the steps of:

providing a first supply voltage;

providing a control circuit and a processing circuit each coupled to receive the first supply voltage;

detecting an interruption in the first supply voltage;

providing a second supply voltage to said control circuit upon said detection; and disabling said processing circuit upon said detection.

12. The method of claim 11, wherein said step of detecting comprises the step of detecting a voltage drop in said first supply voltage.

13. The method of claim 11, wherein in the step of providing said control circuit and said processing circuit, the control circuit comprises a microcontroller.

14. The method of claim 13, wherein in the step of providing a control circuit and said processing circuit, said control circuit further comprises a control logic circuit coupled to said microcontroller.

15. The method of claim 11, wherein in the step of providing a control circuit and said processing circuit, the processing circuit comprises a central processing unit.

16. The method of claim 11, wherein in the step of providing a control circuit and said processing circuit, the processing circuit comprises a display control interface circuit and a display screen.

17. The method of claim 16, wherein said display screen displays in-flight entertainment programs.

18. The method of claim 11, further comprising the step of storing the second supply voltage in a capacitor prior to the step of providing the second supply voltage.

19. The method of claim 11, wherein said second supply voltage is provided for more than 200 ms.

20. The method of claim 11, wherein said second supply voltage is provided for 1100 ms.

* * * * *